March 22, 1966  R. H. FREDERICKS  3,241,882
SEAT BELT POSITIONING DEVICE
Filed Dec. 13, 1961  2 Sheets-Sheet 1
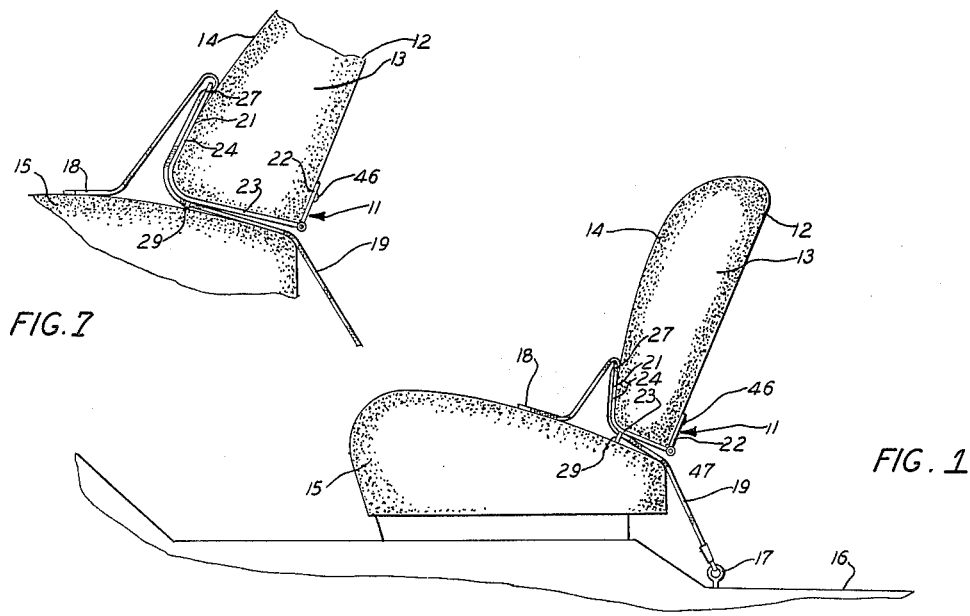
FIG. 7
FIG. 1
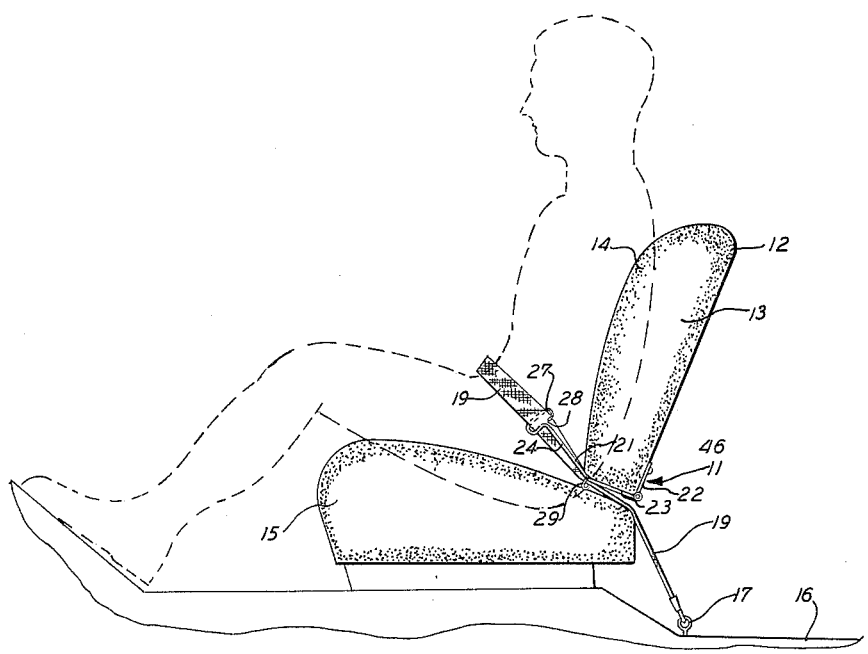
FIG. 6
ROBERT H. FREDERICKS
INVENTOR
BY John R. Faulkner
John J. Roethel
ATTORNEYS March 22, 1966

R. H. FREDERICKS 3,241,882

SEAT BELT POSITIONING DEVICE

Filed Dec. 13, 1961

ROBERT H. FREDERICKS
INVENTOR

BY John R. Faulkner
John J. Roethel

ATTORNEYS

United States Patent Office 3,241,882
Patented Mar. 22, 1966

3,241,882
SEAT BELT POSITIONING DEVICE
Robert H. Fredericks, Dearborn, Mich., assignor to Ford Motor Company, Dearborn, Mich., a corporation of Delaware
Filed Dec. 13, 1961, Ser. No. 159,113
11 Claims. (Cl. 297—385)

This invention relates to a seat belt positioning device and more particularly to a positioning device attached to the seat of an automotive vehicle to hold the seat belt in a readily accessible position when not in use.

The use of seat belts in automotive vehicles has steadily increased in the last few years. The safety aspects of seat belts are fully recognized by the majority of purchasers of automobiles but they have been reluctant to fully accept seat belts as an accessory due to the inconvenience caused by seat belts when they are in an unfastened condition. Unfastened seat belt sections have a tendency to interfere with the egress from a vehicle. They also may get caught in the door openings or work themselves back through the opening between the seat back and the seat into the rear leg room area to the annoyance of the passengers of the vehicle.

Positioning or retraction devices for seat belts which are presently available usually require a modification to the seat belt itself and its fastening means or may even require changes in the structural components of the vehicle.

The seat belt positioning device embodying the present invention comprises a yieldable member which has one end secured to the seat of the vehicle. The other end of this yieldable member engages a portion of the seat belt section to hold it in a nonextended relation against the seat back when the seat belt is unfastened.

The seat belt positioning device of this invention is relatively inexpensive to manufacture and install and does not require any modification of the seat belt or the vehicle structure. Also, the occupant of the vehicle does not have to perform any additional operations to locate the seat belt when the seat belt positioning device of this invention is installed, since the end portion of the seat belt remains in a position where it is readily available to its user.

An object of this invention is to provide a positioning device for a seat belt which is of a simple one-piece construction and may be readily and cheaply installed on any seat.

Another object of this invention is to provide a seat belt positioning device which will hold a portion of the seat belt in a nonextended relation when not in use.

Other objects and advantages of this invention will become more apparent as this description proceeds, particularly in connection with the accompanying drawings in which:

FIGURE 1 is a side elevational view of the seat belt positioning device attached to an unoccupied vehicle seat;

FIGURE 6 is a side view of an enlargement of a portion of the seat positioning device seen in FIGURE 1; and, FIGURE 7 is an enlarged side elevational view of the seat belt positioning device of FIGURE 1 attached to an unoccupied vehicle seat of which only a portion is shown.

Figure 2:
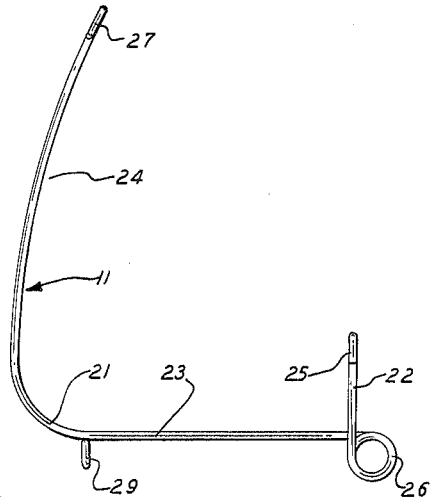
FIGURE 2 is a side view of one embodiment of the seat belt positioning device of this invention.

As seen in FIGURE 1, a seat belt positioning device of the first embodiment of this invention, generally designated 11, is shown attached to a back surface 12 of a seat back 13. The seat back 13, which also has a front surface 14, is pivotally or rigidly attached to the rear edge of a seat 15 mounted on a floor 16 of a vehicle. Seat belts presently available for installation in motor vehicles have one end attached to the floor 16 by a bracket 17 while the end portions 18 at the other end of the seat belts are placed across the seat 15.

Each seat belt comprises a tail section 19 and a buckle section (not shown) which are fastened together to strap the occupant into the seat 15 of the vehicle.

In FIGURE 2 there is shown the seat belt positioning device 11 comprising a spring wire 21 which has a vertical portion 22, a horizontal portion 23, and a contour portion 24. The contour portion 24 is shaped to fit the contour of the front surface 14 of the seat back 13.

Figure 3:
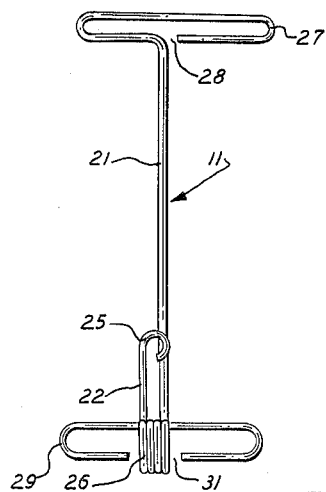
FIGURE 3 is a rear elevational view of the seat belt positioning device shown in FIGURE 2.

As seen in FIGURES 2 and 3, at one end of the vertical portion 22 of the seat belt positioning device 11 is an eye 25 to permit securing of the seat belt positioning device 11 to the seat 15. The spring wire 21 is formed into a coil 26 intermediate the vertical portion 22 and the horizontal portion 23 with a first elongated loop 27 at one end of the contour portion 24 adapted to engage the webbing of the seat belt section 19. This loop 27 is provided with an opening 28, best seen in FIGURE 3, to permit the placing of the seat belt webbing into the loop 27 in case the webbing cannot be threaded through the loop 27. This may occur when the buckle or tail attached to the seat belt section 19 exceeds in cross sectional area the interior dimensions of the loop 27.

A second elongated loop 29 disposed intermediate the horizontal portion 23 and the contour portion 24 is integrally formed with or brazed to the spring wire 21. The second loop 29 may also be provided with an opening 31 as best seen in FIGURE 3 to facilitate the placing of the seat belt webbing into the loop 29.

Figure 4:
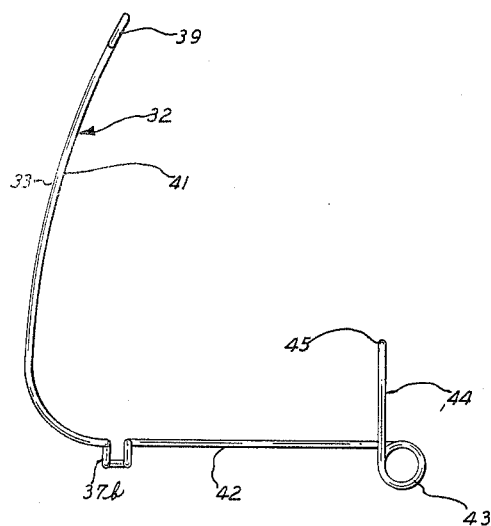
FIGURE 4 is a side elevational view of a second embodiment of the seat positioning device of this invention.
Figure 5:
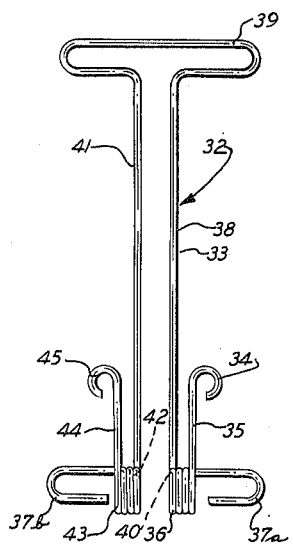
FIGURE 5 is a rear elevational view of the seat belt positioning device shown in FIGURE 4.

A second embodiment of the seat belt positioning device, generally designated 32, is shown in FIGURES 4 and 5. In this embodiment, the seat belt positioning device 32 is also formed out of a continuous piece of spring wire 33, but in order to provide a more rigid structure, all the portions of the seat belt positioning device 32 are formed from a double length of spring wire 33.

As seen in FIGURES 4 and 5, an eye 34 is formed at one end of a first vertical portion 35. A coil 36 consisting of a series of loops is formed at the other end of the first vertical portion 35. The spring wire 33 is continued horizontally to extend into a first horizontal portion 40. At the end of the first horizontal portion 40, the spring wire 33 is bent in a direction normal to the axis of the first horizontal portion 40 to form one-half of an elongated loop 37a before it is bent back until it intersects the horizontal axis. Then the spring wire 33 is continued to form a first contour portion 38.

At the end of the first contour portion 38, the spring wire 33 is shaped into an elongated loop 39 which remains partially open by having the spring wire 33 extend into a second contour portion 41 transversely spaced from and parallel with the first contour portion 38. Then the spring wire 33 is formed into the second half of an elongated loop 37b before it is extended to form a second horizontal portion 42 parallel to the first horizontal portion 40, both being hidden from view in FIGURE 5. From the second horizontal portion 42, the spring wire 33 is continued to form a second coil 43 consisting of a series of loops and a second vertical portion 44 before it is terminated as an eye 45, best seen in FIGURE 5.

As seen in FIGURE 1, the seat belt positioning device 11 is secured to the back surface 12 of the seat back 13 by passing a sheet metal screw 46 through eye 25. The tail section 19 of the seat belt, in this instance, extends through an opening 47 between the seat back 13 and the seat 15 before it is threaded through the second elongated loop 29 and the first elongated loop 27 so that the section 19 of the seat belt is substantially flush with the contour portion of the front surface 14 of the seat back 13. After the section 19 of the seat belt is threaded through the first loop 27, it is turned over the top of the loop 27 before the end portion 18 of the section 19 of the seat belt is placed across the seat 15 as seen in FIGURE 7.

The spring wire 21 holds a portion of the section 19 of the seat belt neatly against the front surface 14 of the seat back 13 when the seat belt is in an unfastened condition as seen in FIGURE 1. The end portion 18 of the section 19 of the seat belt is held in a nonextended relation by the first loop 27 while the second loop 29 keeps the section 19 of the seat belt aligned with the seat belt positioning device 11.

When the seat belt sections are fastened by the occupant of the vehicle as seen in FIGURE 6, the contour portion 24 of the spring wire 21 and the first loop 27 twist slightly to follow the seat belt section 19 across the lap of the occupant.

The seat belt positioning device 32 of the second embodiment of this invention is similar in operation to the first embodiment heretofore described.

It is to be understood that the invention is not to be limited to the exact construction shown and described as various changes and modifications may be made without departing from the spirit and scope of the invention as defined in the appened claims.

I claim:

1. A guard for retaining a passenger vehicle safety belt on a passenger vehicle seat when the safety belt is not engaged with another safety belt to secure a passenger on the seat, said guard comprising a flexible shank member securable by one end thereof to a passenger vehicle seat adjacent the abutment of the seat and back portions of the passenger vehicle seat, said flexible shank member having means adjacent the opposite end thereof slidably engageable with a seat belt, said shank being substantially shorter than a seat belt.

2. A seat belt positioning device for a seat belt having sections thereof extensible across a seat, said seat having a seat back, said seat back having a front surface and a back surface, said seat belt positioning device comprising a spring member having at one end a means for attachment to the back surface of said seat back and at the other end a means for engaging one section of said seat belt, said seat belt positioning device being constructed and arranged to yieldably hold a portion of said one seat belt section in a nonextended relation close to the front surface of said seat back when said seat belt is in an unfastened condition.

3. A seat belt positioning device for a seat belt having one end segment thereof extensible across a seat when in a fastened condition, said seat having a seat back, said seat back having a front surface and a back surface, said seat belt positioning device comprising a spring member having at one end a means for attachment to the seat back and at its other end a second means for engaging a portion of said end segment inward from its terminal end, said spring member yieldably retaining a portion of said end segment in a nonextended relationship close to the front surface of said seat back when said seat belt is in an unfastened condition and being yieldably twisted to maintain engagement with said portion of the end segment when the latter is in an extended relationship across said seat and in a fastened condition.

4. A seat belt positioning device for a seat belt extensible in a fastened or unfastened condition across a seat having a seat back thereon, said seat back having a front surface and a back surface, said seat belt positioning device comprising a spring member having one end attached to the back surface of said seat back and means on its other end engageable with a portion of said seat belt, said seat belt positioning device being constructed and arranged to allow a portion of said seat belt to be twisted when said seat belt is in a fastened condition and to hold said portion of said seat belt in a nonextended relation against the front surface of said seat back when said seat belt is in an unfastened condition.

5. A seat belt positioning device for a seat belt having sections thereof extensible across a seat having a seat back thereon, said seat back having a front surface and a back surface, said seat belt positioning device comprising a spring member having at one end a means for attaching said spring member to the back surface of said seat back, said spring member extending through an opening between the seat and the seat back and following the front surface contour of said seat back, said spring member having an engaging means at the other end to engage a section of said seat belt, said engaging means holding said section of said seat belt in a non-extended relation against the front surface of said seat back above the opening between the seat and the seat back when said seat belt is in an unfastened condition.

6. A seat belt positioning device as described in claim 5 and which is further characterized in that said engaging means is an elongated loop which at least partially encompasses said section of the seat belt.

7. A seat belt positioning device for a seat belt having sections thereof extensible across a seat having a seat back thereon, said seat back having a front surface and a back surface, said seat belt positioning device comprising a spring member having at one end a means for attaching said spring member to the back surface of said seat back and at the other end an elongated loop to engage one section of said seat belt, said spring member extending through an opening between the seat back and the seat and following the front surface contour of said seat back, and a second elongated loop to engage said section of said seat belt being disposed intermediate said first elongated loop and the opening between the seat and the seat back.

8. A seat belt positioning device for a seat belt having sections thereof extensible across a seat having a seat back thereon, said seat back having a front surface and a back surface, said seat belt positioning device comprising a spring member having at one end a means for attaching said spring member to the back surface of said seat back, said spring member extending through an opening between the seat back and the seat and following the front surface contour of said seat back, an elongated loop engaging a section of said seat belt at the other end of said spring member, a coil on said spring member being disposed intermediate said attaching means and said opening between the seat and said seat back.

9. A seat belt positioning device for a seat belt extensible across a seat having a seat back thereon, said seat back having a front surface and a back surface, said seat belt positioning device comprising a spring member having an integrally formed vertical portion, a horizontal portion extending through an opening through the seat and seat back and a contour portion following the front surface contour of said seat back, a first elongated loop integrally formed with said spring member located at one end of said contour portion between said horizontal portion and said contour portion, a second elongated loop integrally formed with said spring member being disposed at the other end of said contour portion, a coil integrally formed with said spring member at one end of said vertical portion and being disposed intermediate said vertical portion and said horizontal portion, an eye integrally formed with said spring member at the other end of said vertical portion.

10. A seat belt positioning device for a seat belt having sections thereof extensible across a seat having a seat back thereon, said seat back having a front surface and a back surface, said seat belt positioning device comprising a vertical portion, a horizontal portion extending through an opening through said seat in the seat back, and a contour portion following the front surface contour of said seat back, said portions formed from at least one length of spring wire, a first elongated loop integrally formed from said spring wire at one end of said contour portion between said contour portion and the horizontal portion, a second elongated loop integrally formed with said spring wire being disposed at the other end of said contour portion, a coil integrally formed with said spring wire at one end of said vertical portion and being disposed intermediate said vertical portion and the horizontal portion, an eye integrally formed with said spring wire at the other end of said vertical portion.

11. A seat belt positioning device for a seat belt extensible across a seat having a seat back thereon, said seat backing having a front surface and a back surface, said seat belt positioning device integrally formed from a spring wire, said seat belt positioning device comprising a first vertical portion and a second vertical portion, a first horizontal portion and a second horizontal portion extending through an opening between said seat and said seat back, a first contour portion and a second contour portion following the contour of the front surface of said seat back, a one-half of an elongated loop at one end of said first contour portion intermediate said first contour portion and said first horizontal portion, a second half of an elongated loop at one end of said second contour portion intermediate said second contour portion and said second horizontal portion, a second elongated loop at the other ends of said first and second contour portions, a first coil at one end of said first vertical portion intermediate the first vertical portion and the first horizontal portion, a second coil at one end of the second vertical portion intermediate said second veritcal portion and said second horizontal portion, an eye at the other end of said first vertical portion, and a second eye at the other end of said second vertical portion.

References Cited by the Examiner
UNITED STATES PATENTS

| | | | |
|---|---|---|---|
| 2,480,915 | 9/1949 | George | 297—388 |
| 2,665,143 | 1/1954 | Rasmussen | 297—385 |
| 2,848,250 | 8/1958 | Sheren | 297—385 |
| 2,855,215 | 10/1958 | Sheren | 297—385 |

FRANK B. SHERRY, *Primary Examiner.*

GEORGE L. BREHM, *Examiner.*

J. S. PETRIE, *Assistant Examiner.*